(12) United States Patent
Narasingarayanapeta

(10) Patent No.: US 11,138,229 B2
(45) Date of Patent: Oct. 5, 2021

(54) DEPENDENCY AWARE IMPROVEMENTS TO SUPPORT PARALLEL REPLAY OR PARALLEL REPLICATION OF OPERATIONS WHICH ARE DIRECTED TO A COMMON INODE

(71) Applicant: NetApp Inc., Sunnyvale, CA (US)

(72) Inventor: Krishna Murthy Chandraiah setty Narasingarayanapeta, Bangalore (IN)

(73) Assignee: NetApp Inc., San Jose, CA (US)

(*) Notice: Subject to any disclaimer, the term of this patent is extended or adjusted under 35 U.S.C. 154(b) by 200 days.

(21) Appl. No.: 16/577,149

(22) Filed: Sep. 20, 2019

(65) Prior Publication Data

US 2021/0089557 A1    Mar. 25, 2021

(51) Int. Cl.
*G06F 15/16* (2006.01)
*G06F 16/27* (2019.01)
*H04L 29/08* (2006.01)
*H04L 29/06* (2006.01)

(52) U.S. Cl.
CPC .......... *G06F 16/275* (2019.01); *H04L 63/101* (2013.01); *H04L 67/1095* (2013.01); *H04L 67/1097* (2013.01)

(58) Field of Classification Search
CPC .............. H04L 63/101; H04L 67/1095; H04L 67/1097
USPC ........................................................ 707/611
See application file for complete search history.

(56) References Cited

U.S. PATENT DOCUMENTS

| | | | | |
|---|---|---|---|---|
| 7,418,464 | B2* | 8/2008 | Cannon | G06F 11/1451 |
| 7,702,953 | B2* | 4/2010 | Spear | G06F 11/2074 |
| | | | | 714/5.11 |
| 8,326,896 | B2* | 12/2012 | Cannon | G06F 16/10 |
| | | | | 707/821 |
| 9,781,201 | B2* | 10/2017 | Tracht | H04L 12/1863 |
| 9,917,896 | B2* | 3/2018 | Powell | G06F 3/065 |
| 10,523,751 | B2* | 12/2019 | Powell | G06F 11/2076 |
| 2005/0165722 | A1* | 7/2005 | Cannon | G06F 11/1456 |
| 2008/0168303 | A1* | 7/2008 | Spear | G06F 11/2058 |
| | | | | 714/6.12 |
| 2008/0281883 | A1* | 11/2008 | Cannon | G06F 11/1456 |
| 2016/0110263 | A1* | 4/2016 | Tracht | G06F 11/1451 |
| | | | | 714/6.23 |
| 2016/0110272 | A1* | 4/2016 | Tracht | G06F 11/14 |
| | | | | 711/162 |
| 2016/0112509 | A1* | 4/2016 | Tracht | H04L 12/1863 |
| | | | | 709/217 |
| 2017/0155713 | A1* | 6/2017 | Powell | G06F 3/067 |

\* cited by examiner

*Primary Examiner* — Moustafa M Meky
(74) *Attorney, Agent, or Firm* — Cooper Legal Group, LLC

(57) ABSTRACT

Techniques are provided for dependency aware parallel splitting of operations. For example, a first operation and a second operation may be replicated in parallel from a first device to a second device if the operations only target a single common inode that is an access control list inode referenced by the operations. An operation that dereferences the access control list inode can be replicated in parallel with other operations if the operation does not have the potential to delete the access control list inode from the second device. In another example, operations may be replicated to the second device in parallel if the operations only affect a single common parent directory inode and where timestamps are only moved forward in time at the second device.

20 Claims, 8 Drawing Sheets

DEPENDENCY AWARE IMPROVEMENTS TO SUPPORT PARALLEL REPLAY OR PARALLEL REPLICATION OF OPERATIONS WHICH ARE DIRECTED TO A COMMON INODE

BACKGROUND

A computing environment may implement data replication and/or other redundancy data access techniques for data loss protection and non-disruptive client access. For example, a first node (e.g., a computing device, a virtual machine, a storage virtual machine, a storage system, a software as a service, etc.) may be configured to provide clients with access to data stored within a first storage device and/or other storage devices. A second node may be configured as a backup for the first node in the event the first node fails. Data may be replicated from the first node to the second node. In this way, the second node can provide clients with access to replicated data in the event the first node fails.

One type of replication is asynchronous replication. When the first node receives an operation from a client device, the first node transmits a replication of the operation to the second node for execution. Irrespective of whether the second node has executed the replicated operation, the first node will transmit an acknowledgment of successful performance of the operation to the client device once the first node has executed the operation.

Another type of replication is synchronous replication, which provides a greater level of data protection guarantees, such as a zero recovery point objective (RPO). This is because the first node does not transmit the acknowledgment until the operation has been executed by the first node and the replicated operation has been executed or acknowledged by the second node. In this way, two copies of data and/or metadata resulting from the operation are maintained before the client receives acknowledgment that the operation was successful.

DETAILED DESCRIPTION

Figure 1:
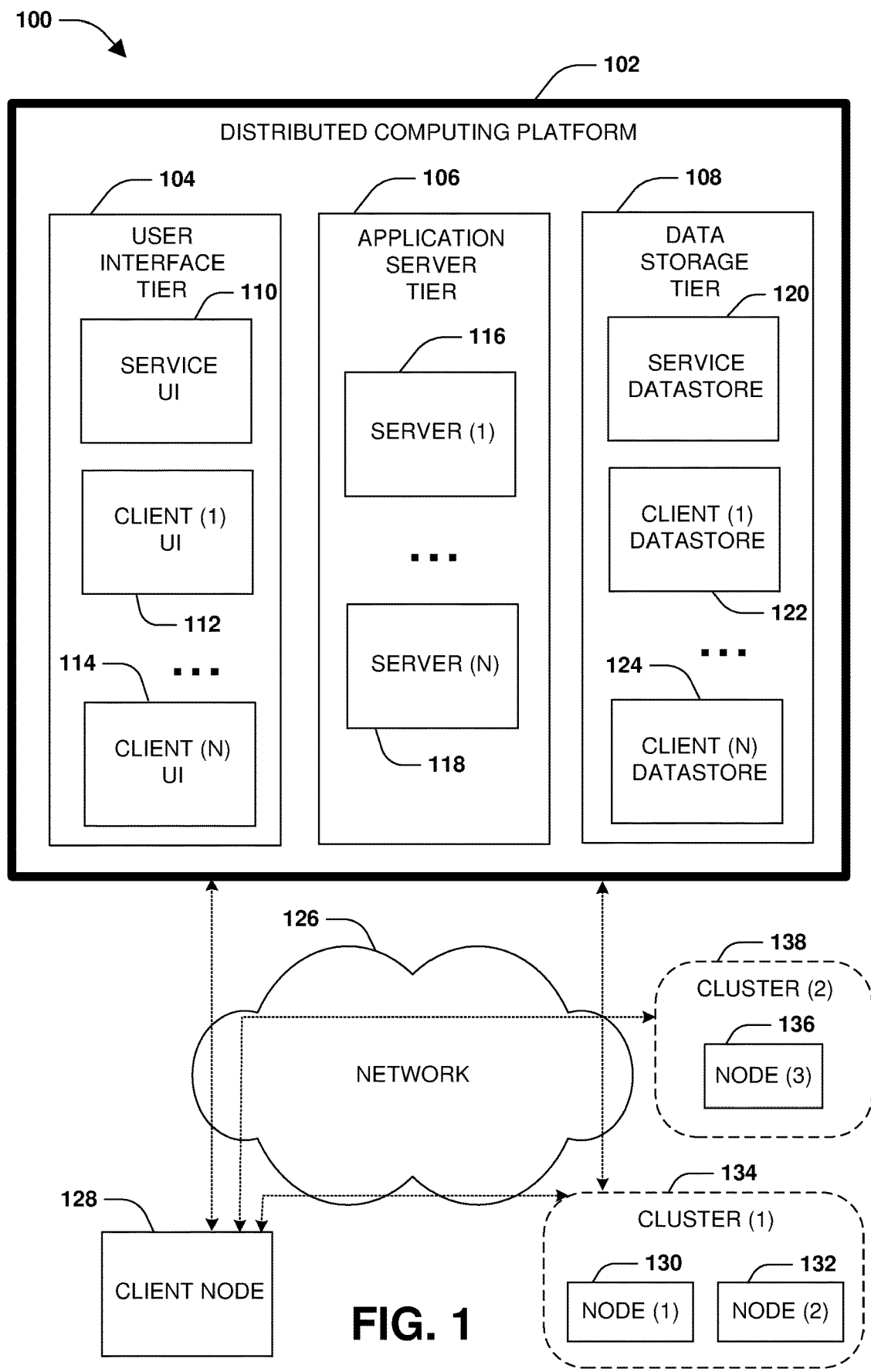
FIG. 1 is a block diagram illustrating an example computing environment in which an embodiment of the invention may be implemented.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A computing environment may implement synchronous replication between a first node and a second node based upon a synchronous replication relationship. For example, an operation (e.g., a data operation, such as a write operation) targeting the first node is executed by the first node and replicated in parallel to the second node for execution. An acknowledgment that the operation is complete is not returned until the operation has been executed by both the first node and the second node. Synchronous replication may be implemented for certain types of data operations and/or metadata operations. Such data operations may comprise a write operation, a punch hole operation, a subfile-sisclone operation, etc. Such metadata operations may comprise a create operation, a link operation, an unlink operation, a rename operation, a set attribute operation, an open operation, a close operation, a create clone operation, etc. Data operations can be processed in parallel amongst the first node and the second node if there are no metadata operations executing at the first node and if an inode (e.g., an inode number) specified by a payload of a data operation is not in common with affected inodes (e.g., inode numbers) of pending metadata operations dispatched to the second node.

During the transition state to a synchronous replication mode and the state of synchronous replication, metadata operations are sequentially split (e.g., executed on the first node and then replicated to the second node). This is done to avoid creating inconsistencies between a storage object maintained by the first node and a replicated storage object maintained by the second node. In an example of an inconsistency, a first metadata operation may be executed at the first node. Inodes affected by the first metadata operation are not known until after the first metadata operation has executed. The first metadata operation may be transmitted to the second node for execution. A second metadata operation may also be executed at the first node. Inodes affected by the second metadata operation are not known until after the second metadata operation has executed. The second metadata operation may be transmitted to the second node for execution. If the second metadata operation ends up being executed before the first metadata operation at the second node (but the first metadata operation was executed first at the first node), then an inconsistency will arise if the first metadata operation and the second metadata operation both affected the same inode. Thus, the metadata operations are serialized on the first node. The metadata operations are also replicated serially to the second node if the operations affect one or more common inodes Unfortunately, this increases replication latency of synchronous replication as well as the time taken to transition to a synchronous mode of replication.

Accordingly, dependencies amongst operations are identified so that independent operations (e.g., metadata operations that do not affect any of the same inodes as one another) can be transmitted to the second node in parallel (e.g., a metadata operation can be transmitted to the second node before receiving acknowledgements that the other pending metadata operations have completed). Dependent operations are replicated sequentially with respect to one another in order to avoid any inconsistencies from out of order execution since the metadata operations affect overlapping inodes.

As provided herein, the identification of independent operations and dependent operations is improved by taking into account additional information and considerations. Such additional information and considerations may relate to whether two operations only affected a single common inode number such as where the only affected inode is a single access control list inode or parent directory inode, whether an operation dereferencing an inode would cause the inode to be deleted at the second node, timestamp consistency (e.g., applying a timestamp value at the second node only if the timestamp value is larger than a current value), qtree ID considerations, etc. It may be appreciated that the terms inode and inode number may be used interchangeably.

FIG. 1 is a diagram illustrating an example operating environment 100 in which an embodiment of the techniques described herein may be implemented. In one example, the techniques described herein may be implemented within a client device 128, such as a laptop, a tablet, a personal computer, a mobile device, a server, a virtual machine, a wearable device, etc. In another example, the techniques described herein may be implemented within one or more nodes, such as a first node 130 and/or a second node 132 within a first cluster 134, a third node 136 within a second cluster 138, etc. A node may comprise a storage controller, a server, an on-premise device, a virtual machine such as a storage virtual machine, hardware, software, or combination thereof. The one or more nodes may be configured to manage the storage and access to data on behalf of the client device 128 and/or other client devices. In another example, the techniques described herein may be implemented within a distributed computing platform 102 such as a cloud computing environment (e.g., a cloud storage environment, a multi-tenant platform, a hyperscale infrastructure comprising scalable server architectures and virtual networking, etc.) configured to manage the storage and access to data on behalf of client devices and/or nodes.

In yet another example, at least some of the techniques described herein are implemented across one or more of the client device 128, the one or more nodes, and/or the distributed computing platform 102. For example, the client device 128 may transmit operations, such as data operations to read data and write data and metadata operations (e.g., a create file operation, a rename directory operation, a resize operation, a set attribute operation, etc.), over a network 126 to the first node 130 for implementation by the first node 130 upon storage. The first node 130 may store data associated with the operations within volumes or other data objects/structures hosted within locally attached storage, remote storage hosted by other computing devices accessible over the network 126, storage provided by the distributed computing platform 102, etc. The first node 130 may replicate the data and/or the operations to other computing devices, such as to the second node 132, the third node 136, a storage virtual machine executing within the distributed computing platform 102, etc., so that one or more replicas of the data are maintained. For example, the third node 136 may host a destination storage volume that is maintained as a replica of a source storage volume of the first node 130. Such replicas can be used for disaster recovery and failover.

In an embodiment, the techniques described herein are implemented by a storage operating system or are implemented by a separate module that interacts with the storage operating system. The storage operating system may be hosted by the client device, 128, a node, the distributed computing platform 102, or across a combination thereof. In an example, the storage operating system may execute within a storage virtual machine, a hyperscaler, or other computing environment. The storage operating system may implement a storage file system to logically organize data within storage devices as one or more storage objects and provide a logical/virtual representation of how the storage objects are organized on the storage devices. A storage object may comprise any logically definable storage element stored by the storage operating system (e.g., a volume stored by the first node 130, a cloud object stored by the distributed computing platform 102, etc.). Each storage object may be associated with a unique identifier that uniquely identifies the storage object. For example, a volume may be associated with a volume identifier uniquely identifying that volume from other volumes. The storage operating system also manages client access to the storage objects.

The storage operating system may implement a file system for logically organizing data. For example, the storage operating system may implement a write anywhere file layout for a volume where modified data for a file may be written to any available location as opposed to a write-in-place architecture where modified data is written to the original location, thereby overwriting the previous data. In an example, the file system may be implemented through a file system layer that stores data of the storage objects in an on-disk format representation that is block-based (e.g., data is stored within 4 kilobyte blocks and inodes are used to identify files and file attributes such as creation time, access permissions, size and block location, etc.).

In an example, deduplication may be implemented by a deduplication module associated with the storage operating system. Deduplication is performed to improve storage efficiency. One type of deduplication is inline deduplication that ensures blocks are deduplicated before being written to a storage device. Inline deduplication uses a data structure, such as an incore hash store, which maps fingerprints of data to data blocks of the storage device storing the data. Whenever data is to be written to the storage device, a fingerprint of that data is calculated and the data structure is looked up using the fingerprint to find duplicates (e.g., potentially duplicate data already stored within the storage device). If duplicate data is found, then the duplicate data is loaded from the storage device and a byte by byte comparison may be performed to ensure that the duplicate data is an actual duplicate of the data to be written to the storage device. If the data to be written is a duplicate of the loaded duplicate data, then the data to be written to disk is not redundantly stored to the storage device. Instead, a pointer or other reference is stored in the storage device in place of the data to be written to the storage device. The pointer points to the duplicate data already stored in the storage device. A reference count for the data may be incremented to indicate that the pointer now references the data. If at some point the pointer no longer references the data (e.g., the deduplicated data is deleted and thus no longer references the data in the storage device), then the reference count is decremented. In this way, inline deduplication is able to deduplicate data before the data is written to disk. This improves the storage efficiency of the storage device.

Background deduplication is another type of deduplication that deduplicates data already written to a storage device. Various types of background deduplication may be implemented. In an example of background deduplication, data blocks that are duplicated between files are rearranged within storage units such that one copy of the data occupies physical storage. References to the single copy can be inserted into a file system structure such that all files or containers that contain the data refer to the same instance of the data. Deduplication can be performed on a data storage device block basis. In an example, data blocks on a storage device can be identified using a physical volume block number. The physical volume block number uniquely identifies a particular block on the storage device. Additionally, blocks within a file can be identified by a file block number. The file block number is a logical block number that indicates the logical position of a block within a file relative to other blocks in the file. For example, file block number 0 represents the first block of a file, file block number 1 represents the second block, etc. File block numbers can be mapped to a physical volume block number that is the actual data block on the storage device. During deduplication operations, blocks in a file that contain the same data are deduplicated by mapping the file block number for the block to the same physical volume block number, and maintaining a reference count of the number of file block numbers that map to the physical volume block number. For example, assume that file block number 0 and file block number 5 of a file contain the same data, while file block numbers 1-4 contain unique data. File block numbers 1-4 are mapped to different physical volume block numbers. File block number 0 and file block number 5 may be mapped to the same physical volume block number, thereby reducing storage requirements for the file. Similarly, blocks in different files that contain the same data can be mapped to the same physical volume block number. For example, if file block number 0 of file A contains the same data as file block number 3 of file B, file block number 0 of file A may be mapped to the same physical volume block number as file block number 3 of file B.

In another example of background deduplication, a changelog is utilized to track blocks that are written to the storage device. Background deduplication also maintains a fingerprint database (e.g., a flat metafile) that tracks all unique block data such as by tracking a fingerprint and other filesystem metadata associated with block data. Background deduplication can be periodically executed or triggered based upon an event such as when the changelog fills beyond a threshold. As part of background deduplication, data in both the changelog and the fingerprint database is sorted based upon fingerprints. This ensures that all duplicates are sorted next to each other. The duplicates are moved to a dup file. The unique changelog entries are moved to the fingerprint database, which will serve as duplicate data for a next deduplication operation. In order to optimize certain filesystem operations needed to deduplicate a block, duplicate records in the dup file are sorted in certain filesystem sematic order (e.g., inode number and block number). Next, the duplicate data is loaded from the storage device and a whole block byte by byte comparison is performed to make sure duplicate data is an actual duplicate of the data to be written to the storage device. After, the block in the changelog is modified to point directly to the duplicate data as opposed to redundantly storing data of the block.

In an example, deduplication operations performed by a data deduplication layer of a node can be leveraged for use on another node during data replication operations. For example, the first node 130 may perform deduplication operations to provide for storage efficiency with respect to data stored on a storage volume. The benefit of the deduplication operations performed on first node 130 can be provided to the second node 132 with respect to the data on first node 130 that is replicated to the second node 132. In some aspects, a data transfer protocol, referred to as the LRSE (Logical Replication for Storage Efficiency) protocol, can be used as part of replicating consistency group differences from the first node 130 to the second node 132. In the LRSE protocol, the second node 132 maintains a history buffer that keeps track of data blocks that it has previously received. The history buffer tracks the physical volume block numbers and file block numbers associated with the data blocks that have been transferred from first node 130 to the second node 132. A request can be made of the first node 130 to not transfer blocks that have already been transferred. Thus, the second node 132 can receive deduplicated data from the first node 130, and will not need to perform deduplication operations on the deduplicated data replicated from first node 130.

In an example, the first node 130 may preserve deduplication of data that is transmitted from first node 130 to the distributed computing platform 102. For example, the first node 130 may create an object comprising deduplicated data. The object is transmitted from the first node 130 to the distributed computing platform 102 for storage. In this way, the object within the distributed computing platform 102 maintains the data in a deduplicated state. Furthermore, deduplication may be preserved when deduplicated data is transmitted/replicated/mirrored between the client device 128, the first node 130, the distributed computing platform 102, and/or other nodes or devices.

In an example, compression may be implemented by a compression module associated with the storage operating system. The compression module may utilize various types of compression techniques to replace longer sequences of data (e.g., frequently occurring and/or redundant sequences) with shorter sequences, such as by using Huffman coding, arithmetic coding, compression dictionaries, etc. For example, an uncompressed portion of a file may comprise "ggggnnnnnnnqqqqqqqqqq", which is compressed to become "4g6n10q". In this way, the size of the file can be reduced to improve storage efficiency. Compression may be implemented for compression groups. A compression group may correspond to a compressed group of blocks. The compression group may be represented by virtual volume block numbers. The compression group may comprise contiguous or non-contiguous blocks.

Compression may be preserved when compressed data is transmitted/replicated/mirrored between the client device 128, a node, the distributed computing platform 102, and/or other nodes or devices. For example, an object may be create by the first node 130 to comprise compressed data. The object is transmitted from the first node 130 to the distributed computing platform 102 for storage. In this way, the object within the distributed computing platform 102 maintains the data in a compressed state.

In an example, various types of synchronization may be implemented by a synchronization module associated with the storage operating system. In an example, synchronous replication may be implemented, such as between the first node 130 and the second node 132. It may be appreciated that the synchronization module may implement synchronous replication between any devices within the operating environment 100, such as between the first node 130 of the first cluster 134 and the third node 136 of the second cluster 138.

During synchronous replication, the first node 130 may receive a write operation from the client device 128. The write operation may target a file stored within a volume managed by the first node 130. The first node 130 replicates the write operation to create a replicated write operation. The first node 130 locally implements the write operation upon the file within the volume. The first node 130 also transmits the replicated write operation to a synchronous replication target, such as the second node 132 that maintains a replica volume as a replica of the volume maintained by the first node 130. The second node 132 will execute the replicated write operation upon the replica volume so that file within the volume and the replica volume comprises the same data. After, the second node 132 will transmit a success message to the first node 130. With synchronous replication, the first node 130 does not respond with a success message to the client device 128 for the write operation until both the write operation is executed upon the volume and the first node 130 receives the success message that the second node 132 executed the replicated write operation upon the replica volume.

In another example, asynchronous replication may be implemented, such as between the first node 130 and the third node 136. It may be appreciated that the synchronization module may implement asynchronous replication between any devices within the operating environment 100, such as between the first node 130 of the first cluster 134 and the distributed computing platform 102. In an example, the first node 130 may establish an asynchronous replication relationship with the third node 136. The first node 130 may capture a baseline snapshot of a first volume as a point in time representation of the first volume. The first node 130 may utilize the baseline snapshot to perform a baseline transfer of the data within the first volume to the third node 136 in order to create a second volume within the third node 136 comprising data of the first volume as of the point in time at which the baseline snapshot was created.

After the baseline transfer, the first node 130 may subsequently create snapshots of the first volume over time. As part of asynchronous replication, an incremental transfer is performed between the first volume and the second volume. In particular, a snapshot of the first volume is created. The snapshot is compared with a prior snapshot that was previously used to perform the last asynchronous transfer (e.g., the baseline transfer or a prior incremental transfer) of data to identify a difference in data of the first volume between the snapshot and the prior snapshot (e.g., changes to the first volume since the last asynchronous transfer). Accordingly, the difference in data is incrementally transferred from the first volume to the second volume. In this way, the second volume will comprise the same data as the first volume as of the point in time when the snapshot was created for performing the incremental transfer. It may be appreciated that other types of replication may be implemented, such as semi-sync replication.

In an embodiment, the first node 130 may store data or a portion thereof within storage hosted by the distributed computing platform 102 by transmitting the data within objects to the distributed computing platform 102. In one example, the first node 130 may locally store frequently accessed data within locally attached storage. Less frequently accessed data may be transmitted to the distributed computing platform 102 for storage within a data storage tier 108. The data storage tier 108 may store data within a service data store 120, and may store client specific data within client data stores assigned to such clients such as a client (1) data store 122 used to store data of a client (1) and a client (N) data store 124 used to store data of a client (N). The data stores may be physical storage devices or may be defined as logical storage, such as a virtual volume, LUNs, or other logical organizations of data that can be defined across one or more physical storage devices. In another example, the first node 130 transmits and stores all client data to the distributed computing platform 102. In yet another example, the client device 128 transmits and stores the data directly to the distributed computing platform 102 without the use of the first node 130.

The management of storage and access to data can be performed by one or more storage virtual machines (SMVs) or other storage applications that provide software as a service (SaaS) such as storage software services. In one example, an SVM may be hosted within the client device 128, within the first node 130, or within the distributed computing platform 102 such as by the application server tier 106. In another example, one or more SVMs may be hosted across one or more of the client device 128, the first node 130, and the distributed computing platform 102. The one or more SVMs may host instances of the storage operating system.

In an example, the storage operating system may be implemented for the distributed computing platform 102. The storage operating system may allow client devices to access data stored within the distributed computing platform 102 using various types of protocols, such as a Network File System (NFS) protocol, a Server Message Block (SMB) protocol and Common Internet File System (CIFS), and Internet Small Computer Systems Interface (iSCSI), and/or other protocols. The storage operating system may provide various storage services, such as disaster recovery (e.g., the ability to non-disruptively transition client devices from accessing a primary node that has failed to a secondary node that is taking over for the failed primary node), backup and archive function, replication such as asynchronous and/or synchronous replication, deduplication, compression, high availability storage, cloning functionality (e.g., the ability to clone a volume, such as a space efficient flex clone), snapshot functionality (e.g., the ability to create snapshots and restore data from snapshots), data tiering (e.g., migrating infrequently accessed data to slower/cheaper storage), encryption, managing storage across various platforms such as between on-premise storage systems and multiple cloud systems, etc.

In one example of the distributed computing platform 102, one or more SVMs may be hosted by the application server tier 106. For example, a server (1) 116 is configured to host SVMs used to execute applications such as storage applications that manage the storage of data of the client (1) within the client (1) data store 122. Thus, an SVM executing on the server (1) 116 may receive data and/or operations from the client device 128 and/or the first node 130 over the network 126. The SVM executes a storage application and/or an instance of the storage operating system to process the operations and/or store the data within the client (1) data store 122. The SVM may transmit a response back to the client device 128 and/or the first node 130 over the network 126, such as a success message or an error message. In this way, the application server tier 106 may host SVMs, services, and/or other storage applications using the server (1) 116, the server (N) 118, etc.

A user interface tier 104 of the distributed computing platform 102 may provide the client device 128 and/or the first node 130 with access to user interfaces associated with the storage and access of data and/or other services provided by the distributed computing platform 102. In an example, a service user interface 110 may be accessible from the distributed computing platform 102 for accessing services subscribed to by clients and/or nodes, such as data replication services, application hosting services, data security services, human resource services, warehouse tracking services, accounting services, etc. For example, client user interfaces may be provided to corresponding clients, such as a client (1) user interface 112, a client (N) user interface 114, etc. The client (1) can access various services and resources subscribed to by the client (1) through the client (1) user interface 112, such as access to a web service, a development environment, a human resource application, a warehouse tracking application, and/or other services and resources provided by the application server tier 106, which may use data stored within the data storage tier 108.

The client device 128 and/or the first node 130 may subscribe to certain types and amounts of services and resources provided by the distributed computing platform 102. For example, the client device 128 may establish a subscription to have access to three virtual machines, a certain amount of storage, a certain type/amount of data redundancy, a certain type/amount of data security, certain service level agreements (SLAs) and service level objectives (SLOs), latency guarantees, bandwidth guarantees, access to execute or host certain applications, etc. Similarly, the first node 130 can establish a subscription to have access to certain services and resources of the distributed computing platform 102.

As shown, a variety of clients, such as the client device 128 and the first node 130, incorporating and/or incorporated into a variety of computing devices may communicate with the distributed computing platform 102 through one or more networks, such as the network 126. For example, a client may incorporate and/or be incorporated into a client application (e.g., software) implemented at least in part by one or more of the computing devices.

Examples of suitable computing devices include personal computers, server computers, desktop computers, nodes, storage servers, nodes, laptop computers, notebook computers, tablet computers or personal digital assistants (PDAs), smart phones, cell phones, and consumer electronic devices incorporating one or more computing device components, such as one or more electronic processors, microprocessors, central processing units (CPU), or controllers. Examples of suitable networks include networks utilizing wired and/or wireless communication technologies and networks operating in accordance with any suitable networking and/or communication protocol (e.g., the Internet). In use cases involving the delivery of customer support services, the computing devices noted represent the endpoint of the customer support delivery process, i.e., the consumer's device.

The distributed computing platform 102, such as a multi-tenant business data processing platform or cloud computing environment, may include multiple processing tiers, including the user interface tier 104, the application server tier 106, and a data storage tier 108. The user interface tier 104 may maintain multiple user interfaces, including graphical user interfaces and/or web-based interfaces. The user interfaces may include the service user interface 110 for a service to provide access to applications and data for a client (e.g., a "tenant") of the service, as well as one or more user interfaces that have been specialized/customized in accordance with user specific requirements, which may be accessed via one or more APIs.

The service user interface 110 may include components enabling a tenant to administer the tenant's participation in the functions and capabilities provided by the distributed computing platform 102, such as accessing data, causing execution of specific data processing operations, etc. Each processing tier may be implemented with a set of computers, virtualized computing environments such as a storage virtual machine or storage virtual server, and/or computer components including computer servers and processors, and may perform various functions, methods, processes, or operations as determined by the execution of a software application or set of instructions.

The data storage tier 108 may include one or more data stores, which may include the service data store 120 and one or more client data stores. Each client data store may contain tenant-specific data that is used as part of providing a range of tenant-specific business and storage services or functions, including but not limited to ERP, CRM, eCommerce, Human Resources management, payroll, storage services, etc. Data stores may be implemented with any suitable data storage technology, including structured query language (SQL) based relational database management systems (RDBMS), file systems hosted by operating systems, object storage, etc.

In accordance with one embodiment of the invention, the distributed computing platform 102 may be a multi-tenant and service platform operated by an entity in order to provide multiple tenants with a set of business related applications, data storage, and functionality. These applications and functionality may include ones that a business uses to manage various aspects of its operations. For example, the applications and functionality may include providing web-based access to business information systems, thereby allowing a user with a browser and an Internet or intranet connection to view, enter, process, or modify certain types of business information or any other type of information.

Figure 2:
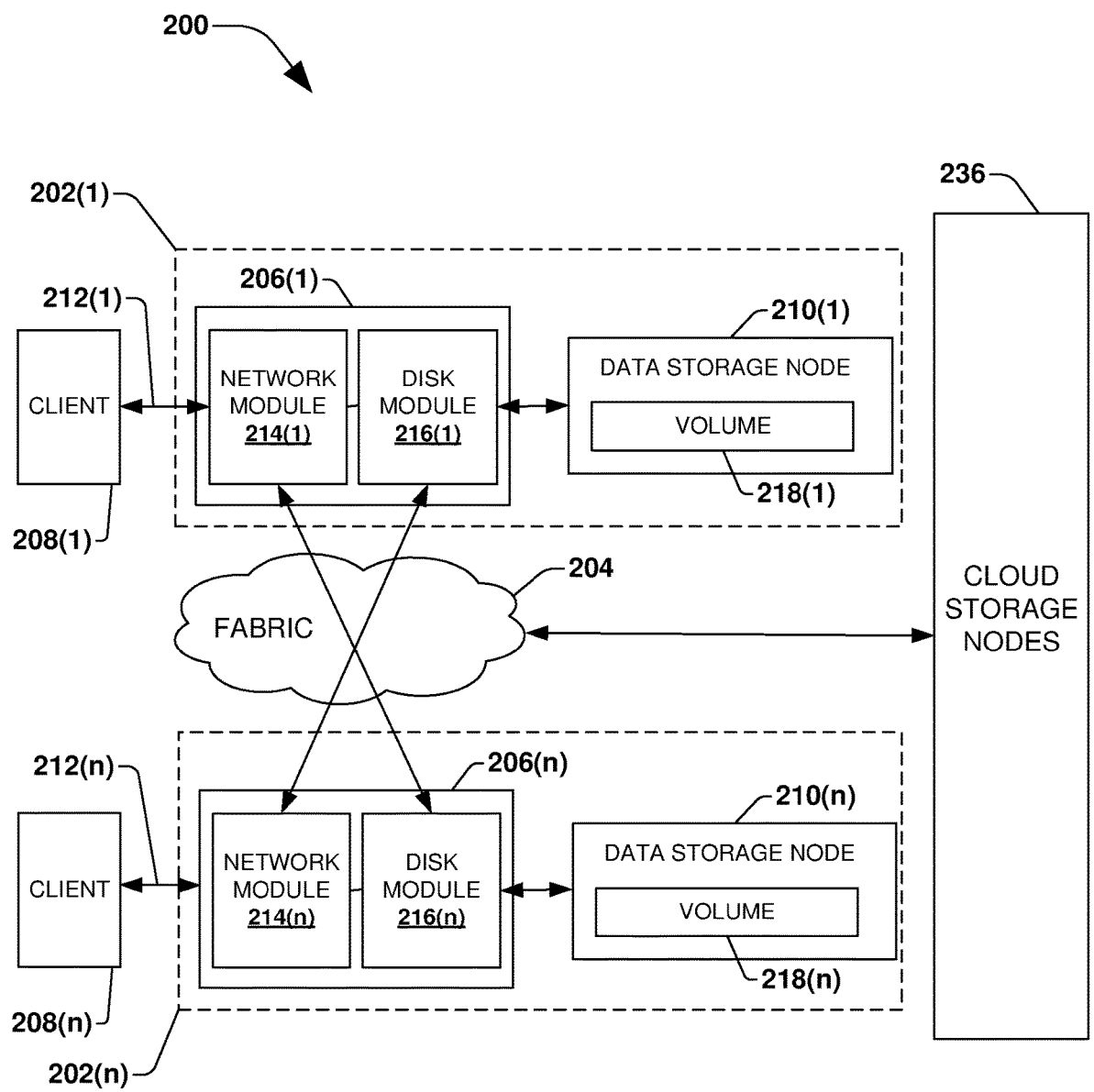
FIG. 2 is a block diagram illustrating a network environment with exemplary node computing devices.

A clustered network environment 200 that may implement one or more aspects of the techniques described and illustrated herein is shown in FIG. 2. The clustered network environment 200 includes data storage apparatuses 202(1)-202(n) that are coupled over a cluster or cluster fabric 204 that includes one or more communication network(s) and facilitates communication between the data storage apparatuses 202(1)-202(n) (and one or more modules, components, etc. therein, such as, node computing devices 206(1)-206(n), for example), although any number of other elements or components can also be included in the clustered network environment 200 in other examples. This technology provides a number of advantages including methods, non-transitory computer readable media, and computing devices that implement the techniques described herein.

In this example, node computing devices 206(1)-206(n) can be primary or local storage controllers or secondary or remote storage controllers that provide client devices 208(1)-208(n) with access to data stored within data storage devices 210(1)-210(n) and cloud storage device(s) 236. The node computing devices 206(1)-206(n) may be implemented as hardware, software (e.g., a storage virtual machine), or combination thereof.

The data storage apparatuses 202(1)-202(n) and/or node computing devices 206(1)-206(n) of the examples described and illustrated herein are not limited to any particular geographic areas and can be clustered locally and/or remotely via a cloud network, or not clustered in other examples. Thus, in one example the data storage apparatuses 202(1)-202(n) and/or node computing device 206(1)-206(n) can be distributed over a plurality of storage systems located in a plurality of geographic locations (e.g., located on-premise, located within a cloud computing environment, etc.); while in another example a clustered network can include data storage apparatuses 202(1)-202(n) and/or node computing device 206(1)-206(n) residing in a same geographic location (e.g., in a single on-site rack).

In the illustrated example, one or more of the client devices 208(1)-208(n), which may be, for example, personal computers (PCs), computing devices used for storage (e.g., storage servers), or other computers or peripheral devices, are coupled to the respective data storage apparatuses 202(1)-202(n) by network connections 212(1)-212(n). Network connections 212(1)-212(n) may include a local area network (LAN) or wide area network (WAN) (i.e., a cloud network), for example, that utilize TCP/IP and/or one or more Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 208(1)-208(n) may be general-purpose computers running applications and may interact with the data storage apparatuses 202(1)-202(n) using a client/server model for exchange of information. That is, the client devices 208(1)-208(n) may request data from the data storage apparatuses 202(1)-202(n) (e.g., data on one of the data storage devices 210(1)-210(n) managed by a network storage controller configured to process I/O commands issued by the client devices 208(1)-208(n)), and the data storage apparatuses 202(1)-202(n) may return results of the request to the client devices 208(1)-208(n) via the network connections 212(1)-212(n).

The node computing devices 206(1)-206(n) of the data storage apparatuses 202(1)-202(n) can include network or host nodes that are interconnected as a cluster to provide data storage and management services, such as to an enterprise having remote locations, cloud storage (e.g., a storage endpoint may be stored within cloud storage device(s) 236), etc., for example. Such node computing devices 206(1)-206(n) can be attached to the cluster fabric 204 at a connection point, redistribution point, or communication endpoint, for example. One or more of the node computing devices 206(1)-206(n) may be capable of sending, receiving, and/or forwarding information over a network communications channel, and could comprise any type of device that meets any or all of these criteria.

In an example, the node computing devices 206(1) and 206(n) may be configured according to a disaster recovery configuration whereby a surviving node provides switchover access to the storage devices 210(1)-210(n) in the event a disaster occurs at a disaster storage site (e.g., the node computing device 206(1) provides client device 212(n) with switchover data access to data storage devices 210(n) in the event a disaster occurs at the second storage site). In other examples, the node computing device 206(n) can be configured according to an archival configuration and/or the node computing devices 206(1)-206(n) can be configured based on another type of replication arrangement (e.g., to facilitate load sharing). Additionally, while two node computing devices are illustrated in FIG. 2, any number of node computing devices or data storage apparatuses can be included in other examples in other types of configurations or arrangements.

As illustrated in the clustered network environment 200, node computing devices 206(1)-206(n) can include various functional components that coordinate to provide a distributed storage architecture. For example, the node computing devices 206(1)-206(n) can include network modules 214(1)-214(n) and disk modules 216(1)-216(n). Network modules 214(1)-214(n) can be configured to allow the node computing devices 206(1)-206(n) (e.g., network storage controllers) to connect with client devices 208(1)-208(n) over the storage network connections 212(1)-212(n), for example, allowing the client devices 208(1)-208(n) to access data stored in the clustered network environment 200.

Further, the network modules 214(1)-214(n) can provide connections with one or more other components through the cluster fabric 204. For example, the network module 214(1) of node computing device 206(1) can access the data storage device 210(n) by sending a request via the cluster fabric 204 through the disk module 216(n) of node computing device 206(n). The cluster fabric 204 can include one or more local and/or wide area computing networks (i.e., cloud networks) embodied as Infiniband, Fibre Channel (FC), or Ethernet networks, for example, although other types of networks supporting other protocols can also be used.

Disk modules 216(1)-216(n) can be configured to connect data storage devices 210(1)-210(2), such as disks or arrays of disks, SSDs, flash memory, or some other form of data storage, to the node computing devices 206(1)-206(n). Often, disk modules 216(1)-216(n) communicate with the data storage devices 210(1)-210(n) according to the SAN protocol, such as SCSI or FCP, for example, although other protocols can also be used. Thus, as seen from an operating system on node computing devices 206(1)-206(n), the data storage devices 210(1)-210(n) can appear as locally attached. In this manner, different node computing devices 206(1)-206(n), etc. may access data blocks, files, or objects through the operating system, rather than expressly requesting abstract files.

While the clustered network environment 200 illustrates an equal number of network modules 214(1)-214(2) and disk modules 216(1)-216(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 208(1)-208(n) can be networked with the node computing devices 206(1)-206(n) in the cluster, over the storage connections 212(1)-212(n). As an example, respective client devices 208(1)-208(n) that are networked to a cluster may request services (e.g., exchanging of information in the form of data packets) of node computing devices 206(1)-206(n) in the cluster, and the node computing devices 206(1)-206(n) can return results of the requested services to the client devices 208(1)-208(n). In one example, the client devices 208(1)-208(n) can exchange information with the network modules 214(1)-214(n) residing in the node computing devices 206(1)-206(n) (e.g., network hosts) in the data storage apparatuses 202(1)-202(n).

In one example, the storage apparatuses 202(1)-202(n) host aggregates corresponding to physical local and remote data storage devices, such as local flash or disk storage in the data storage devices 210(1)-210(n), for example. One or more of the data storage devices 210(1)-210(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 218(1)-218(n) in this example, although any number of volumes can be included in the aggregates. The volumes 218(1)-218(n) are virtual data stores or storage objects that define an arrangement of storage and one or more filesystems within the clustered network environment 200. Volumes 218(1)-218(n) can span a portion of a disk or other storage device, a collection of disks, or portions of disks, for example, and typically define an overall logical arrangement of data storage. In one example volumes 218(1)-218(n) can include stored user data as one or more files, blocks, or objects that reside in a hierarchical directory structure within the volumes 218(1)-218(n).

Volumes 218(1)-218(n) are typically configured in formats that may be associated with particular storage systems, and respective volume formats typically comprise features that provide functionality to the volumes 218(1)-218(n), such as providing the ability for volumes 218(1)-218(n) to form clusters, among other functionality. Optionally, one or more of the volumes 218(1)-218(n) can be in composite aggregates and can extend between one or more of the data storage devices 210(1)-210(n) and one or more of the cloud storage device(s) 236 to provide tiered storage, for example, and other arrangements can also be used in other examples.

In one example, to facilitate access to data stored on the disks or other structures of the data storage devices 210(1)-210(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 210(1)-210(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 210(1)-210(n) can have one or more physical ports, wherein each physical port can be assigned a target address (e.g., SCSI target address). To represent respective volumes, a target address on the data storage devices 210(1)-210(n) can be used to identify one or more of the LUNs. Thus, for example, when one of the node computing devices 206(1)-206(n) connects to a volume, a connection between the one of the node computing devices 206(1)-206(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 3:
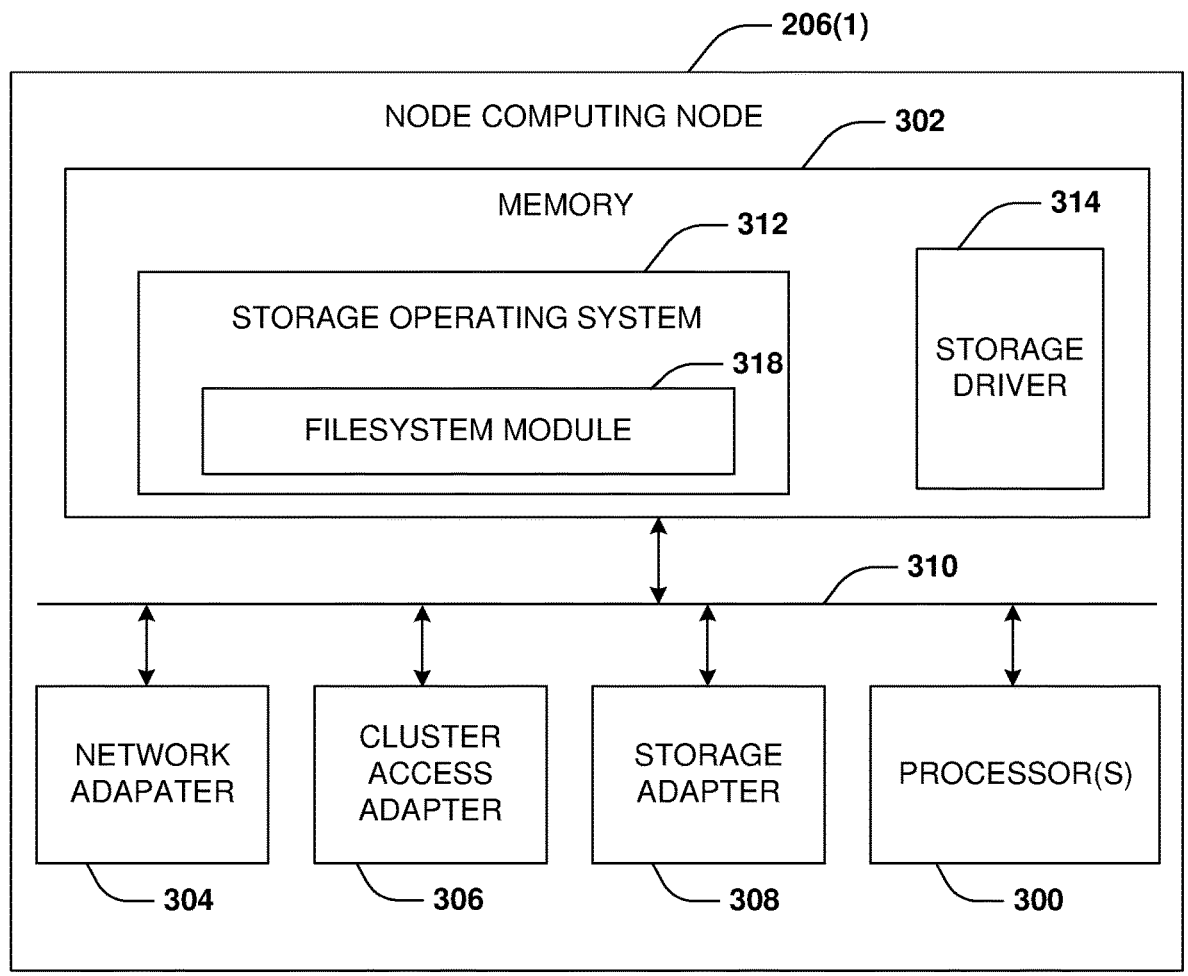
FIG. 3 is a block diagram illustrating an exemplary node computing device.

Referring to FIG. 3, node computing device 206(1) in this particular example includes processor(s) 300, a memory 302, a network adapter 304, a cluster access adapter 306, and a storage adapter 308 interconnected by a system bus 310. In other examples, the node computing device 206(1) comprises a virtual machine, such as a virtual storage machine. The node computing device 206(1) also includes a storage operating system 312 installed in the memory 302 that can, for example, implement a RAID data loss protection and recovery scheme to optimize reconstruction of data of a failed disk or drive in an array, along with other functionality such as deduplication, compression, snapshot creation, data mirroring, synchronous replication, asynchronous replication, encryption, etc. In some examples, the node computing device 206(n) is substantially the same in structure and/or operation as node computing device 206(1), although the node computing device 206(n) can also include a different structure and/or operation in one or more aspects than the node computing device 206(1).

The network adapter 304 in this example includes the mechanical, electrical and signaling circuitry needed to connect the node computing device 206(1) to one or more of the client devices 208(1)-208(n) over network connections 212(1)-212(n), which may comprise, among other things, a point-to-point connection or a shared medium, such as a local area network. In some examples, the network adapter 304 further communicates (e.g., using TCP/IP) via the cluster fabric 204 and/or another network (e.g. a WAN) (not shown) with cloud storage device(s) 236 to process storage operations associated with data stored thereon.

The storage adapter 308 cooperates with the storage operating system 312 executing on the node computing device 206(1) to access information requested by one of the client devices 208(1)-208(n) (e.g., to access data on a data storage device 210(1)-210(n) managed by a network storage controller). The information may be stored on any type of attached array of writeable media such as magnetic disk drives, flash memory, and/or any other similar media adapted to store information.

In the exemplary data storage devices 210(1)-210(n), information can be stored in data blocks on disks. The storage adapter 308 can include I/O interface circuitry that couples to the disks over an I/O interconnect arrangement, such as a storage area network (SAN) protocol (e.g., Small Computer System Interface (SCSI), Internet SCSI (iSCSI), hyperSCSI, Fiber Channel Protocol (FCP)). The information is retrieved by the storage adapter 308 and, if necessary, processed by the processor(s) 300 (or the storage adapter 308 itself) prior to being forwarded over the system bus 310 to the network adapter 304 (and/or the cluster access adapter 306 if sending to another node computing device in the cluster) where the information is formatted into a data packet and returned to a requesting one of the client devices 208(1)-208(2) and/or sent to another node computing device attached via the cluster fabric 204. In some examples, a storage driver 314 in the memory 302 interfaces with the storage adapter to facilitate interactions with the data storage devices 210(1)-210(n).

The storage operating system 312 can also manage communications for the node computing device 206(1) among other devices that may be in a clustered network, such as attached to a cluster fabric 204. Thus, the node computing device 206(1) can respond to client device requests to manage data on one of the data storage devices 210(1)-210(n) or cloud storage device(s) 236 (e.g., or additional clustered devices) in accordance with the client device requests.

The file system module 318 of the storage operating system 312 can establish and manage one or more filesystems including software code and data structures that implement a persistent hierarchical namespace of files and directories, for example. As an example, when a new data storage device (not shown) is added to a clustered network system, the file system module 318 is informed where, in an existing directory tree, new files associated with the new data storage device are to be stored. This is often referred to as "mounting" a filesystem.

In the example node computing device 206(1), memory 302 can include storage locations that are addressable by the processor(s) 300 and adapters 304, 306, and 308 for storing related software application code and data structures. The processor(s) 300 and adapters 304, 306, and 308 may, for example, include processing elements and/or logic circuitry configured to execute the software code and manipulate the data structures.

The storage operating system 312, portions of which are typically resident in the memory 302 and executed by the processor(s) 300, invokes storage operations in support of a file service implemented by the node computing device 206(1). Other processing and memory mechanisms, including various computer readable media, may be used for storing and/or executing application instructions pertaining to the techniques described and illustrated herein. For example, the storage operating system 312 can also utilize one or more control files (not shown) to aid in the provisioning of virtual machines.

In this particular example, the memory 302 also includes a module configured to implement the techniques described herein.

The examples of the technology described and illustrated herein may be embodied as one or more non-transitory computer or machine readable media, such as the memory 302, having machine or processor-executable instructions stored thereon for one or more aspects of the present technology, which when executed by processor(s), such as processor(s) 300, cause the processor(s) to carry out the steps necessary to implement the methods of this technology, as described and illustrated with the examples herein. In some examples, the executable instructions are configured to perform one or more steps of a method described and illustrated later.

Figure 4:
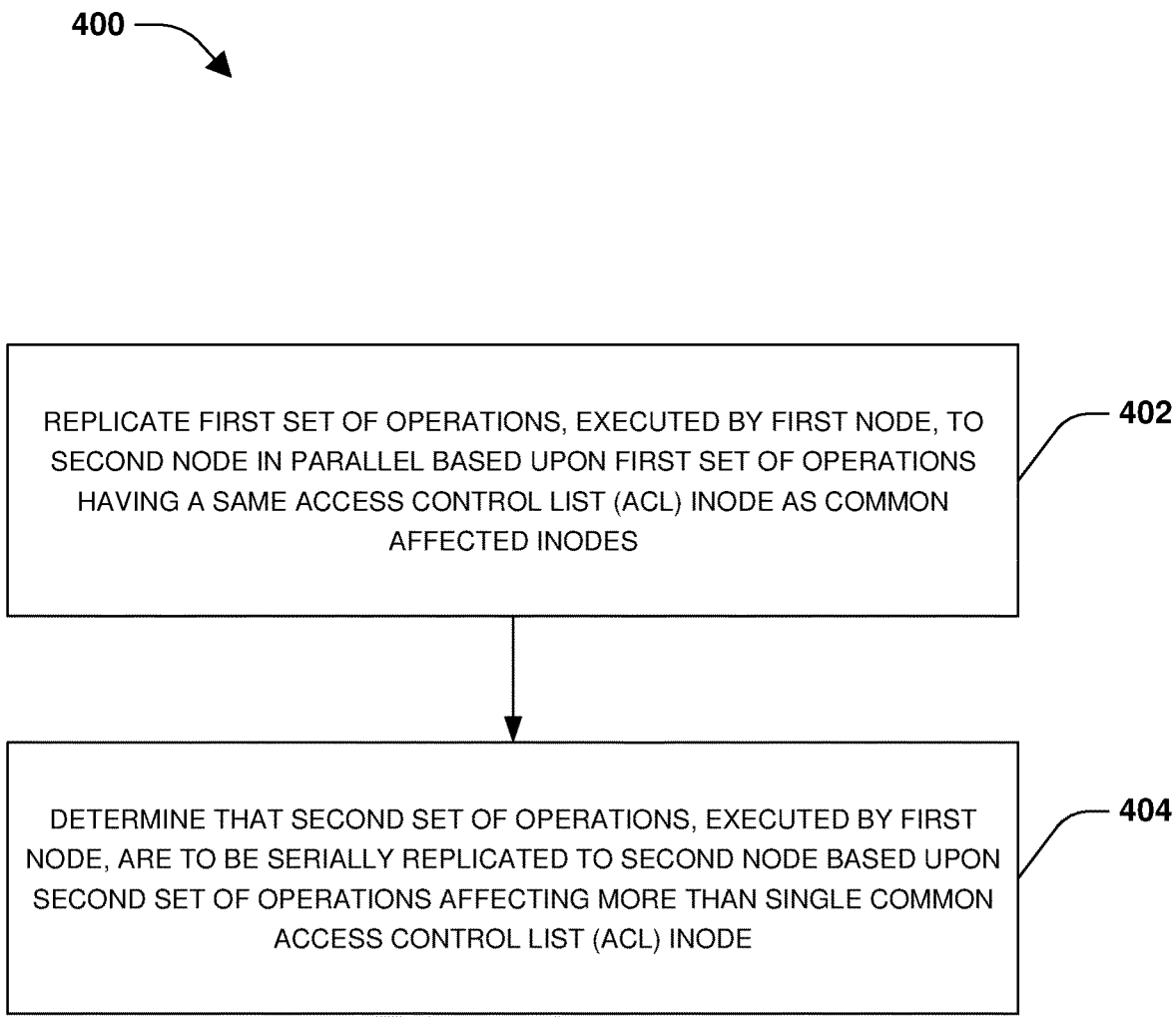
FIG. 4 is a flow chart illustrating an example method dependency aware improvements to support parallel replay or parallel replication of operations which are directed to a common inode.
Figure 5:
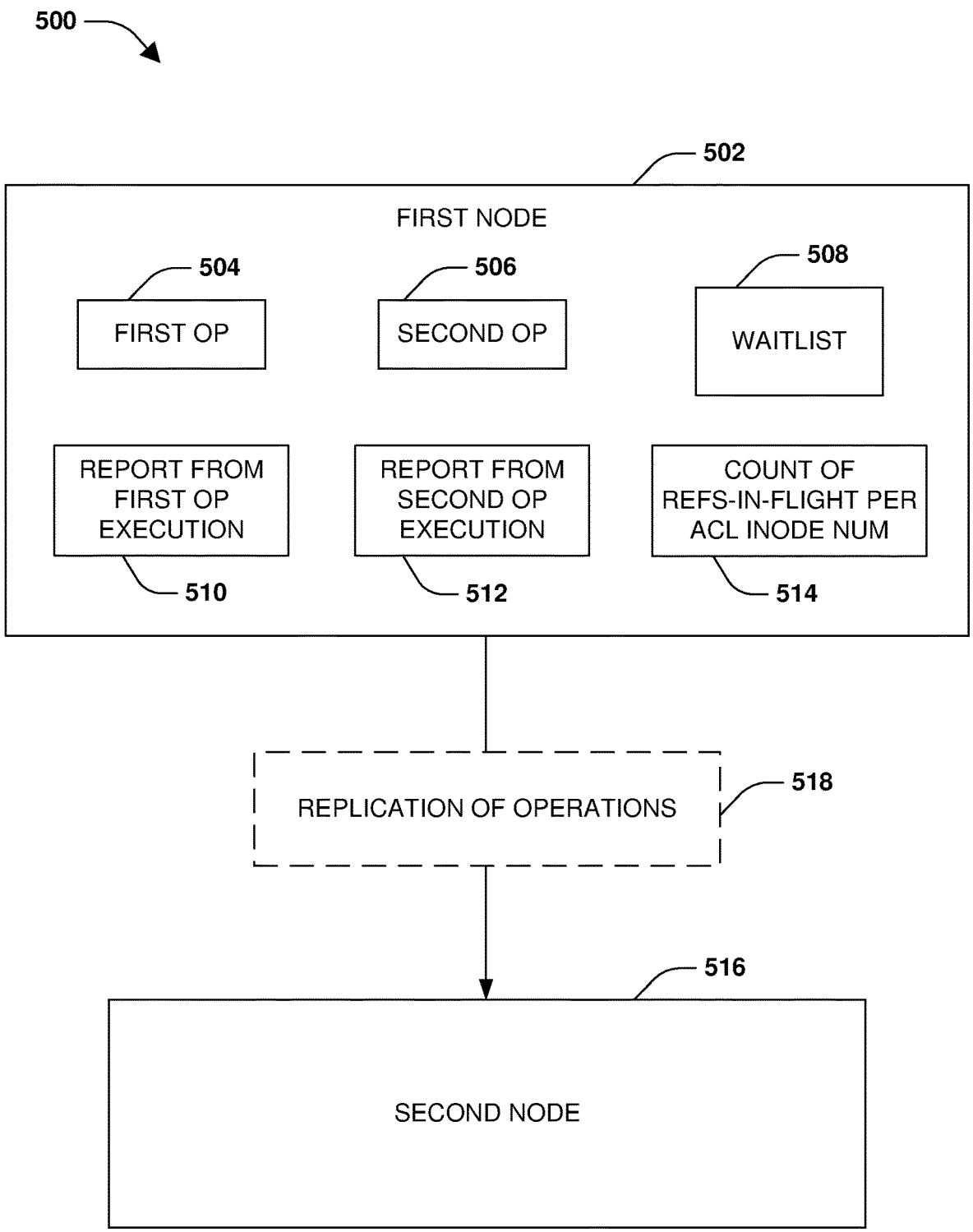
FIG. 5 is a block diagram illustrating an example system for dependency aware improvements to support parallel replay or parallel replication of operations which are directed to a common inode.

One embodiment of dependency aware parallel splitting of operations is illustrated by an exemplary method 400 of FIG. 4 and further described in conjunction with system 500 of FIG. 5. A first node 502 may have a synchronous replication relationship with a second node 516, as illustrated by FIG. 5. The first node 502 and/or the second node 516 may comprise a computing device, a storage controller, a virtual machine, a storage virtual machine, a software as a service, storage functionality executing in a cloud computing environment, or other hardware, software, or combination thereof.

A splitter component is configured to synchronously replicate 518 operations targeting the first node 502 to the second node 516. For example, the splitter component intercepts a data operation targeting a first storage object maintained by the first node 502. The data operation may comprise a write operation to modify data of the first storage object. The data operation can be evaluated to determine what inodes (e.g., inode numbers) will be affected by execution of the data operation, such as an inode of the first storage object. The splitter component may transmit the data operation to the first node 502 for execution upon the first storage object, along with replicating the data operation as a replicated data operation to the second node 516 for execution upon a second storage object. The data operation and the replicated data operation may be transmitted in parallel (e.g., transmitted without having to wait on the other operation to complete first). Data operations can be processed in parallel amongst the first node 502 and the second node 516 if there are no metadata operations executing at the first node 502 and if inodes specified by a payload of a data operation is not in common with affected inodes of pending metadata operations dispatched to the second node 516. It may be appreciated that the comparison of inodes may relate to comparing inode numbers to see if there are any common inode numbers.

A count of pending data operations is maintained by the splitter component. The splitter component updates the count of pending data operations to a value of 2 in order to indicate that the data operation and the replicated data operation are pending. The count is incremented when a data operation is dispatched to one of the nodes. The count is decremented when a notification is received that a node has successfully executed a data operation.

If the count is equal to or greater than 1, then incoming metadata operations will be withheld from being executed at either node. For example, a metadata operation is received by the splitter component. Because the count of pending data operations greater than 1, the metadata operation is held by the splitter component until the count of pending data operations is 0.

The splitter component may receive notifications that the first node 502 successfully executed the data operation and the second node 516 successfully executed the replicated data operation. Accordingly, the splitter component decrements the count of pending data operations to zero. Thus, the metadata operation is dispatched to the first node 502 for execution based upon the count of pending data operations being 0, thus indicating that there are no pending data operations being executed by the nodes.

As a result of the metadata operation being executed by the first node 502, a list of inodes affected by the metadata operation is received from the metadata operation by the splitter component. The list of inodes affected by the metadata operation may indicate that the inode of the first storage object was modified.

In one example, metadata operations are sequentially executed at the first node 502. For example, an incoming metadata operation is not dispatched to the first node 502 until execution the metadata operation is acknowledged by the first node 502 as complete. This is because there may be overlap in inodes affected by the metadata operations. These affected inodes are not known until after execution, and thus the affected inodes would be unknown at the time of dispatch because affected inodes are only realized once a metadata operation has finished execution. Thus, inconsistencies could arise where metadata operations are executed in a different order by the first node 502 than the ordered dispatched by the splitter component to the first node 502. For example, if the metadata operation is to set a value to 1 and the incoming metadata operation is to change that value from 1 to 4, then a consistent result would be the value being 4 after the metadata operations are complete. However, if the metadata operation is executed after the incoming metadata operation, then an inconsistent result would arise because the final value would be 1 instead of the expected value of 4. In another example, if two data operations are allowed to execute in parallel at the first node 502, then a determination is made as to which operation is executed first and which operation is executed later. Using that order, the operations can be processed using a dependency graph. To simplify this, a single metadata operation may be allowed to execute at the first node 502 at a time, for example.

A dependency of the metadata operation with respect to pending metadata operations replicated to the second node 516 is determined. The dependency is determined based upon whether an inode occurs within both the list of inodes affected by the metadata operation and a list of inodes affected by pending metadata operations dispatched to the second node 516 but not yet acknowledged as complete. It may be appreciated that the comparison of inodes may relate to comparing inode numbers. When a pending metadata operation is dispatched to the second node 516, the affected inodes of that pending metadata operation are inserted into the list of inodes affected by pending metadata operations dispatched to the second node 516, and are removed once the pending metadata operation is acknowledged by the second node 516 as being complete.

In some embodiments, the metadata operation may be determined to be an independent metadata operation that is independent of pending metadata operations if certain affected inodes (e.g., inode numbers) within the list of inodes affected by the metadata operation do not match certain affected inodes (e.g., inode numbers) within the list of inodes affected by pending metadata operations. In some embodiments, metadata operation may be determined to be a dependent metadata operation that is dependent with respect to one or more pending metadata operations if at least one affected inode (e.g., inode number) within the list of inodes affected by the metadata operation matches at least one affected inode (e.g., inode number) within the list of inodes affected by pending metadata operations. As will be described in further detail, the determination of dependency in enhanced by taking into account additional information and considerations. Such additional information and considerations may relate to whether two operations only affected a single common inode number such as where the only affected inode is a single access control list inode or parent directory inode, whether an operation dereferencing an inode would cause the inode to be deleted at the second node, timestamp consistency (e.g., applying a timestamp value at the second node only if the timestamp value is larger than a current value), qtree ID considerations, etc.

The metadata operation is dispatched to the second node 516 based upon a determination (e.g., an inode number comparison) that affected inodes within the list of inodes affected by the metadata operation do not match affected inodes within the list of inodes affected by pending metadata operations other than if the only common affected inode is an access control list inode or parent directory inode. Otherwise, the metadata operation would be withheld from being dispatched if at least one affected inode within the list of inodes affected by the metadata operation matches at least one affected inode within the list of inodes affected by pending metadata operations other than if the only common affected inode is an access control list inode or parent directory inode. In this way, a plurality of independent metadata operations may be dispatched to the second node 516 without having to wait on notifications as to other independent metadata operations successfully completed because there is no overlap in inodes affected by the plurality of independent metadata operations other than if the only common affected inode is an access control list inode or parent directory inode. This decreases the replication latency of metadata operations to the second node 516 because independent metadata operations do not have to be sequentially dispatched to the second node 516 since the independent metadata operations affect non-overlapping sets of inodes with respect to one another other than if the only common affected inode is an access control list inode or parent directory inode.

As provided herein, the identification of dependency amongst operations is enhanced based upon additional considerations and information. When an operation, such as a file operation, is executed by the first node 502, a report is generated. The report may specify a list of affected inode numbers of inodes such as access control list (ACL) inodes affected by the execution of the operation. The report may specify whether a new ACL inode was created by the operation. The report may specify whether an ACL inode was deleted because a last reference to the ACL inode was dropped based upon execution of the operation. The report may specify whether the operation was in reference to an existing ACL inode. The report may specify whether the operation was a dereference to an existing ACL inode and may specify a reference count (nlink-before-deref) on the ACL inode prior to the dereference.

Access control lists may be implemented as extended inodes within a public inode space. Access control lists specify access control entities (ACEs) as content. An access control list allows an external entity, such as a client, to specify access control and permissions for storage objects hosted by nodes. Access control lists can be inherited. For example, an access control list may be specified for a root of an export, such as a volume, qtree, directory, etc. The entire export tree inside the export will inherit the access control list specified for the root. The access control list is inherited by having file and directory inodes reference the access control list inode. For example, when a file is created within a volume, the file will inherit an access control list associated with the volume by increasing a reference count to an access control list inode of the access control list. If the file is deleted, then the reference count is decremented.

Under certain conditions, multiple operations may be replicated from the first node 502 to the second node 516 in parallel even though the operations affect a same inode (e.g., two operations that affect only one inode in common that is an access control list inode).

At 402, a first set of operations may be executed at the first node 502, such as a first operation 504 and a second operation 506. Execution of the first operation 504 will return a first report 510 specifying a list of affected inode numbers, whether a new ACL inode was created by the first operation 504, whether an ACL inode was deleted based upon execution of the first operation 504, whether the first operation 504 was in reference to an existing ACL inode, whether the first operation 504 was a dereference to an existing ACL inode and may specify a reference count (nlink-before-deref) on the ACL inode prior to the dereference, etc. Execution of the second operation 506 will return a second report 512 specifying a list of affected inode numbers, whether a new ACL inode was created by the second operation 506, whether an ACL inode was deleted based upon execution of the second operation 506, whether the second operation 506 was in reference to an existing ACL inode, whether the second operation 506 was a dereference to an existing ACL inode and may specify a reference count (nlink-before-deref) on the ACL inode prior to the dereference, etc.

The first report 510 and the second report 512 may be compared to determine whether the first operation 504 and the second operation 506 can be replicated 518 from the first node 502 to the second node 516 in parallel (the operations are independent of one another) or should be replicated serially (the operations are dependent upon one another). In an example, if the comparison of the first report 510 and the second report 512 indicates that the first operation 504 and the second operation 506 affect only a single common inode that is an access control list inode by referencing the access control list inode, then the first operation 504 and the second operation 506 are independent of one another and can be replicated 518 in parallel to the second node 516. However, at 404, if the comparison of the first report 510 and the second report 512 indicates that the first operation 504 and the second operation 506 both affected other common inodes than a single common access control list inode (e.g., the first operation 504 and the second operation 506 affect the same file inode), then the first operation 504 and the second operation 506 are dependent and are to be replicated 518 serially to the second node 516.

In another example, a waitlist 508 and a count of references-in-flight 514 per access control list inode number are used to determine whether operations that dereference access control list inodes can be replicated in parallel to the second node 516 or are to be replicated serially to the second node 516. For example, the count of references-in-flight 514 may be maintained per access control list inode number to track a count of operations replicated to the second node 516 that modify (e.g., decrement) a reference count of an access control list inode. Thus, if the first node 502 replicates an operation that modified an access control list inode to the second node 516, then a count of references-in-flight for that access control list inode is incremented. Once the second node 516 has executed and acknowledged the replicated operation as complete, then the count of references-in-flight for that access control list inode is decremented. If an operation is unable at a point in time to be replicated to the second node 516 (e.g., the operation is dependent with respect to another operation dispatched to the second node 516 because the operations both modify the same file inode), then the operation is waitlisted (queued) within the waitlist 508 for subsequent replicated to the second node 516.

Accordingly, the waitlist 508 and the count of references-in-flight 514 per access control list inode number are used to determine whether an operation that dereferences an access control list inode can be replicated in parallel to the second node 516 with other operations related to the second node 516. In particular, if the operation is to create an access control list inode, then the operation will act as a barrier for that access control list inode. If the operation is to delete an access control list inode, then the operation will act as a barrier for that access control list inode. If execution of the operation at the first node 502 results in decrementing a reference count of an access control list inode, then a determination is made as to whether there are any operations waitlisted (queued) within the waitlist 508 against the particular access control inode number. If there is at least one operation waitlisted (queued) within the waitlist 508 against the particular access control inode number, then the operation is queued into the waitlist 508 for the access control inode number (e.g., queued at a tail of the waitlist 508).

If the waitlist 508 for the access control inode number is empty, then a difference between the count of references-in-flight 514 for the access control inode number and a reference count of the access control list inode prior to being decremented by the operation at the first node 502 (nlink-before-deref) is determined to see if the operation has the potential or not to delete the access control list inode at the second node 516. The operation has the potential to delete the access control list inode if the count of references-in-flight 514 and the operation would decrement a reference count of the access control list inode to 0. For example, if the difference between the count of references-in-flight 514 and the reference count of the access control list inode prior to being decremented by the operation at the first node 502 (nlink-before-deref) is greater than 1, then the operation is replicated 518 to the second node 516 because the operation does not have the potential to cause the access control list inode to be deleted at the second node 516 otherwise due to decrementing that reference count of the access control list inode to 0.

If the difference between the count of references-in-flight 514 and the reference count of the access control list inode prior to being decremented by the operation at the first node 502 (nlink-before-deref) is 1, then the operation is queued within the waitlist 508 for the access control list inode number because the operation has the potential to cause the access control list inode to be deleted at the second node 516 due to decrementing that reference count of the access control list inode to 0.

When the second node 516 successfully executes an operation replicated to the second node 516 by the first node 502, then second node 516 will transmit a callback to the first node 502 for the operation. The first node 502 will decrement the count of references-in-flight 514 for the access control list inode referenced by the operation. Upon receiving the callback, the first node 502 will replicate 518 a waitlisted (queued) operation within the waitlist 508 for the access control list inode node to the second node 516.

Figure 6:
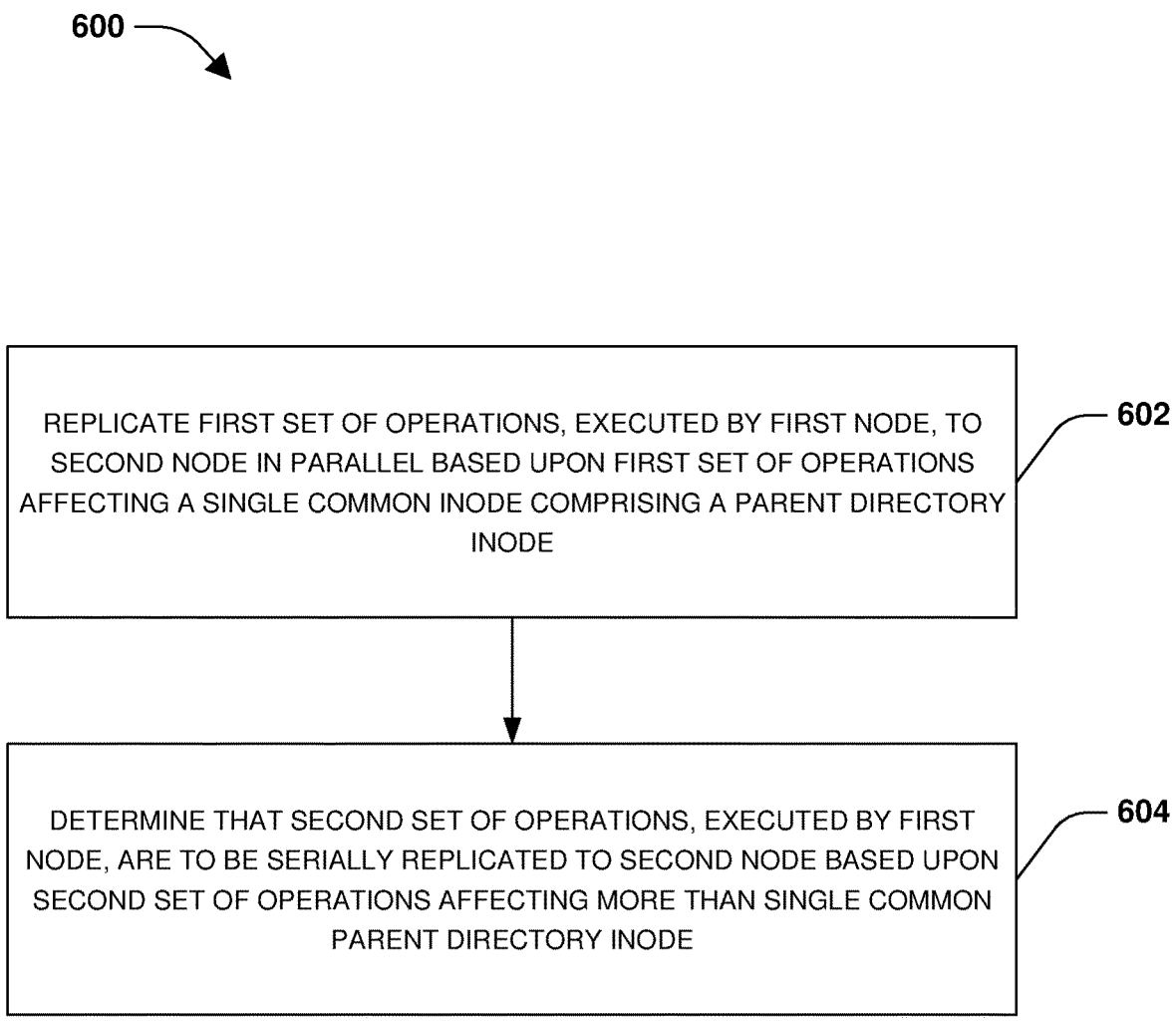
FIG. 6 is a flow chart illustrating an example method for dependency aware improvements to support parallel replay or parallel replication of operations which are directed to a common inode.
Figure 7:
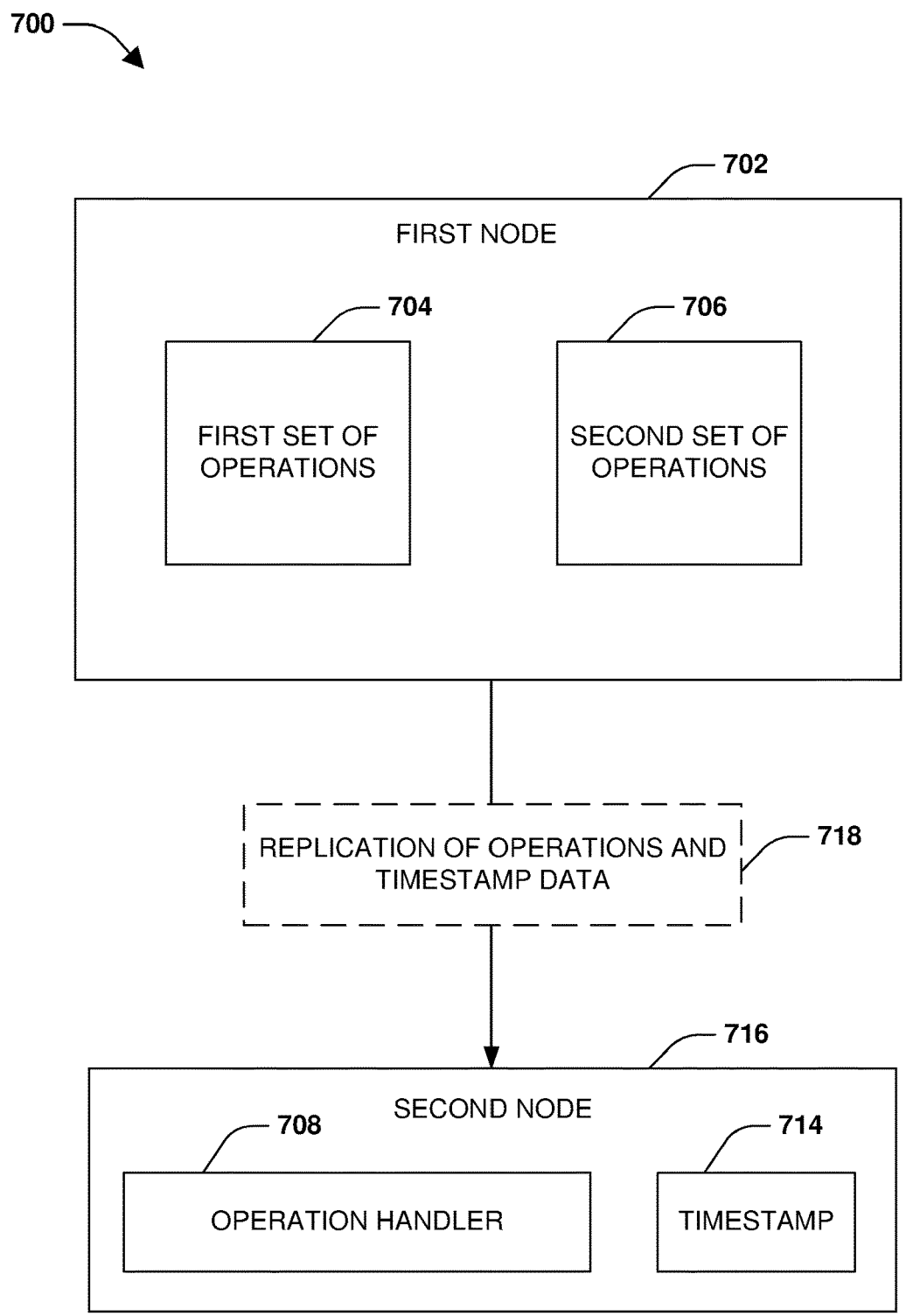
FIG. 7 is a block diagram illustrating an example system for dependency aware improvements to support parallel replay or parallel replication of operations which are directed to a common inode.

One embodiment of dependency aware parallel splitting of operations is illustrated by an exemplary method 600 of FIG. 6 and further described in conjunction with system 700 of FIG. 7. A first node 702 may have a synchronous replication relationship with a second node 716, as illustrated by FIG. 7. The first node 702 and/or the second node 716 may comprise a computing device, a storage controller, a virtual machine, a storage virtual machine, a software as a service, storage functionality executing in a cloud computing environment, or other hardware, software, or combination thereof. A splitter component is configured to replicate operations targeting the first node 702 to the second node 716.

The first node 702 may maintain metadata, such as timestamps, for each storage object such as a file, directory, etc. maintained by the first node 702. For example, a timestamp may be maintained for a parent directory inode of a parent directory. The timestamp may be updated based upon an occurrence of an event, such as when execution of an operation modifies the parent directory inode. The second node 716 may maintain replicated storage objects that are replicas of the storage objects maintained by the first node 702. The second node 716 may also maintain timestamps for the replicated storage objects, such as a timestamp 714 for a replicated parent directory inode of a replicated parent directory maintained as a replica of the parent directory maintained by the first node 702.

Under normal operation, an operation handler 708 of the second node 716 is configured to assign a timestamp value of a most recently executed replicated operation to a timestamp of an affected inode regardless of whether the timestamp value is earlier in time than or later in time than a current timestamp value of the timestamp. However, this can result in inconsistent timestamp values between the first node 702 and the second node 716 when replicated operations are executed out of order that affect the same parent directory inode. Accordingly, the operation handler 708 is reconfigured to refrain from modifying a timestamp of a parent directory inode with timestamp values of replicated operations that are smaller than (occurring earlier in time than) a current value of the timestamp. In this way, timestamp consistency between the first node 702 and the second node 716 is achieved.

At 602, a first set of operations 704 executed by the first node 702 are replicated 718 with timestamp data in parallel based upon a determination that the first set of operations 704 affect only a single common inode that is a parent directory inode. Because the operation handler 708 is reconfigured to only apply timestamp values to a timestamp of a replicated parent directory inode that is a replica of the parent directory inode that are larger than a current value of the timestamp, the first set of operations 704 can be executed in any order. This will result in a final value of the timestamp that will be the largest timestamp value, which will match a timestamp value of the parent directory inode at the first node 702. At 604, a second set of operations 706 executed by the first node 702 are identified for serial replication to the second node 716 based upon the second set of operations 706 affect more than a single common parent directory inode, and thus are dependent with respect to one another.

In an example, operations executed by the first node 702 may affect structures. A structure, such as a qtree, may correspond to a special directory that has an inode number and has an additional structure identifier. In some instances, an operation to delete a structure may result in freeing a structure identifier of the structure that is then later reused by an operation to create a new structure that will use the same structure identifier. This could cause inconsistencies and issues when operations are being replicated in parallel to the second node 716. Accordingly, if a first operation and a second operation executed by the first node 702 are associated with a same structure identifier (e.g., the first operation deletes a structure having a structure identifier that is reused by the second operation to create a new structure with the same structure identifier), then the two operations are dependent upon one another and are serially replicated to the second node 716. Otherwise, the operations may be replicated to the second node 716 in parallel.

According to a further aspect of the present disclosure, an apparatus/machine/system for dependency aware parallel splitting of operations comprises a means for replicating a first set of operations, executed by a first node, to a second node in parallel based upon a determination that the first set of operations affected a single common inode comprising an access control list (ACL) inode referenced by the first set of operations and a means for determining that a second set of operations, executed by the first node, are to be serially replicated to the second node based upon the second set of operations affecting more than a single common ACL inode.

According to a further aspect of the present disclosure, an apparatus/machine/system for dependency aware parallel splitting of operations comprises a means for replicating a first set of operations, executed by a first node, to a second node in parallel based upon a determination that the first set of operations affected a single common inode comprising a parent directory inode and a means for determining that a second set of operations, executed by the first node, are to be serially replicated to the second node based upon the second set of operations affecting more than a single common parent directory inode.

Figure 8:
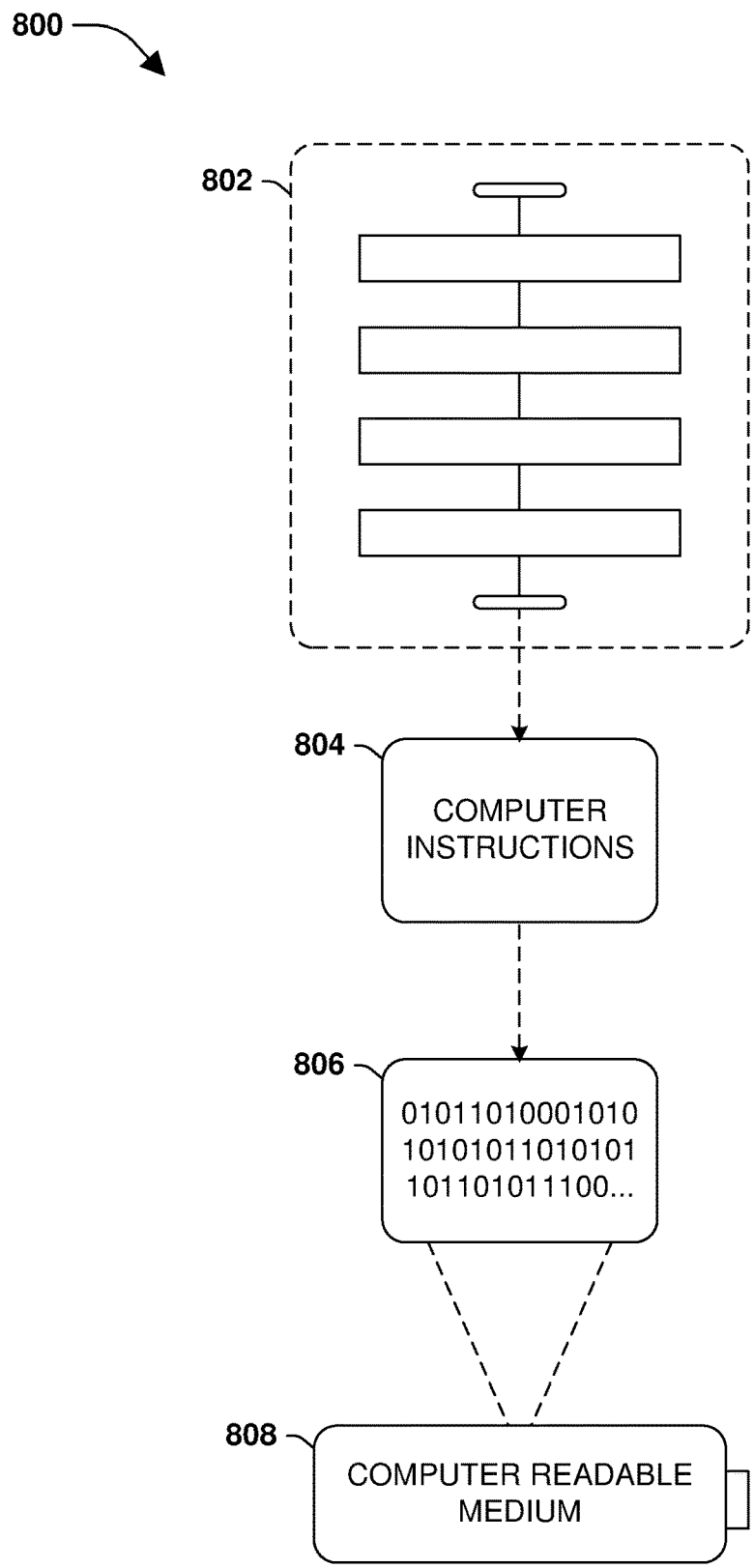
FIG. 8 is an example of a computer readable medium in which an embodiment of the invention may be implemented.

Still another embodiment involves a computer-readable medium 800 comprising processor-executable instructions configured to implement one or more of the techniques presented herein. An example embodiment of a computer-readable medium or a computer-readable device that is devised in these ways is illustrated in FIG. 8, wherein the implementation comprises a computer-readable medium 808, such as a compact disc-recordable (CD-R), a digital versatile disc-recordable (DVD-R), flash drive, a platter of a hard disk drive, etc., on which is encoded computer-readable data 806. This computer-readable data 806, such as binary data comprising at least one of a zero or a one, in turn comprises a processor-executable computer instructions 804 configured to operate according to one or more of the principles set forth herein. In some embodiments, the processor-executable computer instructions 804 are configured to perform a method 802, such as at least some of the exemplary method 400 of FIG. 4 and/or at least some of the exemplary method 600 of FIG. 6, for example. In some embodiments, the processor-executable computer instructions 804 are configured to implement a system, such as at least some of the exemplary system 500 of FIG. 5 and/or at least some of the exemplary system 700 of FIG. 7, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
replicating a first set of operations, executed by a first node, to a second node in parallel based upon a determination that the first set of operations affected a single common inode comprising an access control list (ACL) inode referenced by the first set of operations; and
determining that a second set of operations, executed by the first node, are to be serially replicated to the second node based upon the second set of operations affecting more than a single common ACL inode.

2. The method of claim 1, comprising:
tracking a references in flight count of operations replicated to the second node that modify a reference count of the ACL inode.

3. The method of claim 1, comprising:
treating an ACL inode create operation of a first ACL inode as a barrier for the first ACL inode.

4. The method of claim 1, comprising:
treating an ACL inode delete operation of a first ACL inode as a barrier for the first ACL inode.

5. The method of claim 1, comprising:
determining that a first operation resulted in decrementing a reference count of the ACL inode at the first node based upon the first operation dereferencing the ACL inode.

6. The method of claim 5, comprising:
replicating the first operation with the first set of operations based upon a determination that the first operation lacks a potential to delete the ACL inode at the second node.

7. The method of claim 5, comprising:
queuing the first operation for replication to the second node based upon a determination that there is at least one operation queued within a waitlist for the ACL inode.

8. The method of claim 5, comprising:
replicating the first operation to the second node based upon a determination that a waitlist for the ACL inode is empty and that a difference between a references in flight count of operations replicated to the second node that modify the reference count of the ACL inode and the reference count of the ACL inode prior to being decremented at the first node is greater than 1.

9. The method of claim 5, comprising:
queuing the first operation for replication to the second node based upon a determination that a waitlist for the ACL inode is empty and that a difference between a references in flight count of operations replicated to the second node that modify the reference count of the ACL inode and the reference count of the ACL inode prior to being decremented is 1.

10. The method of claim 2, comprising:
decrementing the references in flight count of operations based upon receiving an ACL reference callback from the second node for an operation replicated to the second node.

11. The method of claim 1, comprising:
replicating a queued operation, to dereference a first ACL inode, to the second node based upon receiving an ACL reference callback from the second node for a replicated operation targeting the first ACL inode.

12. A non-transitory machine readable medium comprising instructions for performing a method, which when executed by a machine, causes the machine to:
replicate a first set of operations, executed by a first node, to a second node in parallel based upon a determination that the first set of operations affected a single common inode comprising a parent directory inode; and
determine that a second set of operations, executed by the first node, are to be serially replicated to the second node based upon the second set of operations affecting more than a single common parent directory inode.

13. The non-transitory machine readable medium of claim 12, wherein the instructions cause the machine to:
configure an operation handler of the second node to refrain from modifying a timestamp of the parent directory inode based upon a timestamp value of an operation being smaller than a current value of the timestamp of the parent directory inode.

14. The non-transitory machine readable medium of claim 12, wherein the instructions cause the machine to:
determine whether a first operation and a second operation should be replicated in parallel to the second node based upon whether the first operation and the second operation are associated with a same qtree identifier.

15. The non-transitory machine readable medium of claim 14, wherein the instructions cause the machine to:
replicate the first operation and the second operation in parallel based upon the first operation and the second operation being associated with different qtree identifiers.

16. The non-transitory machine readable medium of claim 14, wherein the instructions cause the machine to:
replicate the first operation and the second operation serially based upon the first operation and the second operation being associated with the same qtree identifier.

17. The non-transitory machine readable medium of claim 14, wherein the first operation is to delete a first qtree comprising a first qtree identifier.

18. The non-transitory machine readable medium of claim 14, wherein the second operation is to create a new qtree comprising a qtree identifier.

19. A computing node comprising:
a memory comprising machine executable code for performing a method; and
a processor coupled to the memory, the processor configured to execute the machine executable code to cause the processor to:
replicate a first set of operations, executed by a first node, to a second node in parallel based upon a determination that the first set of operations affected a single common inode comprising an access control list (ACL) inode referenced by the first set of operations; and
determine that a second set of operations, executed by the first node, are to be serially replicated to the second node based upon the second set of operations affecting more than a single common ACL inode.

20. The computing node of claim 19, wherein the machine executable code causes the processor to:
track a references in flight count of operations replicated to the second node that modify a reference count of the ACL inode.

* * * * *